(12) United States Patent
Rao et al.

(10) Patent No.: US 12,555,410 B2
(45) Date of Patent: Feb. 17, 2026

(54) SITTING POSTURE DETECTION APPARATUS AND METHOD

(71) Applicant: SigmaStar Technology Ltd., Fujian (CN)

(72) Inventors: Jing-Song Rao, Xiamen (CN); Xiang-Wei Lin, Xiamen (CN); Fei-Yang Tong, Xiamen (CN); Cheng-Wei Zheng, Shanghai (CN)

(73) Assignee: SIGMASTAR TECHNOLOGY LTD., Fujian (CN)

( * ) Notice: Subject to any disclaimer, the term of this patent is extended or adjusted under 35 U.S.C. 154(b) by 276 days.

(21) Appl. No.: 18/465,248

(22) Filed: Sep. 12, 2023

(65) Prior Publication Data

US 2024/0153307 A1 May 9, 2024

(30) Foreign Application Priority Data

Nov. 3, 2022 (CN) .......................... 202211371557.7

(51) Int. Cl.
*G06V 40/16* (2022.01)
*G06T 7/70* (2017.01)
*G06V 10/82* (2022.01)
*G06V 40/20* (2022.01)

(52) U.S. Cl.
CPC .............. *G06V 40/172* (2022.01); *G06T 7/70* (2017.01); *G06V 10/82* (2022.01); *G06V 40/20* (2022.01)

(58) Field of Classification Search
CPC ...... G06V 40/20; G06V 40/172; G06V 10/82; G06T 7/70
See application file for complete search history.

(56) References Cited

PUBLICATIONS

Zhang, et al. (Computer English Translation of Chinese Patent No. CN 111414780 A). (Year: 2020).*
Shi, et al. (Computer English Translation of Chinese Patent No. CN 112613444 A) (Year: 2021).*
Cai (Computer English Translation of Chinese Patent No. CN 112861564 A). (Year: 2021).*
Computer English Translation of Chinese Patent No. Cn 112200088 A). (Year: 2021).*

* cited by examiner

*Primary Examiner* — Daniel G Mariam
(74) *Attorney, Agent, or Firm* — Edell, Shapiro & Finnan, LLC (57) ABSTRACT

A sitting posture detection method includes: identifying an input image to generate a face frame under detection and a human frame under detection of a person under detection; calculating a plurality of face angles of the face frame under detection; calculating a plurality of bone feature point coordinates of the human frame under detection; and generating standard sitting posture data according to the face angles and the bone feature point coordinates, and determining a sitting posture of the person under detection according to the face angles, the bone feature point coordinates and the standard sitting posture data.

11 Claims, 7 Drawing Sheets

SITTING POSTURE DETECTION APPARATUS AND METHOD

This application claims the benefit of China application Serial No. CN202211371557.7, filed on Nov. 3, 2022, the subject matter of which is incorporated herein by reference.

BACKGROUND OF THE INVENTION

Field of the Invention

The present application relates to a sitting posture detection technique, and more particularly to a sitting posture detection apparatus and method.

Description of the Related Art

Humans are prone to unhealthy sitting postures such as having bent torsos, bent backs and bowed heads while using computers for work or entertainment. Maintaining such unhealthy sitting postures over an extended period of time easily leads to health issues of humans.

Conventionally, humans merely rely on visual observation to pay attention whether heads or postures are at inappropriate angles. However, judgment by one's own perspectives is not always accurate. With the availability of accurate sitting posture techniques for users to detect sitting postures by diversified detection mechanisms, health care can be greatly benefited.

SUMMARY OF THE INVENTION

In view of the issues of the prior art, it is an object of the present application to provide a sitting posture detection apparatus and method so as to improve the prior art.

The present application provides a sitting posture detection apparatus including a processor. The processor is configured to execute a program code of a sitting posture detection system. The sitting posture detection system includes a face and human identification module, a face angle estimation module, a body posture estimation module and a detection module. The face and human identification module is configured to identify an input image to generate a face frame under detection and a human frame under detection of a person under detection. The face angle estimation module is configured to generate multiple face angles of the face frame under detection. The body posture estimation module is configured to generate multiple bone feature point coordinates of the human frame under detection. The detection module is configured to generate standard sitting posture data according to the face angles and the bone feature point coordinates, and determine a sitting posture of the person under detection according to the face angles, the bone feature point coordinates and the standard sitting posture data.

The present application further provides a sitting posture detection method, including: identifying an input image to generate a face frame under detection and a human frame under detection of a person under detection; calculating a plurality of face angles of the face frame under detection; calculating a plurality of bone feature point coordinates of the human frame under detection; generating standard sitting posture data according to the face angles and the bone feature point coordinates, and determining a sitting posture of the person under detection according to the face angles, the bone feature point coordinates and the standard sitting posture data.

Features, implementations and effects of the present application are described in detail in preferred embodiments with the accompanying drawings below.

BRIEF DESCRIPTION OF THE DRAWINGS

To better describe the technical solution of the embodiments of the present application, drawings involved in the description of the embodiments are introduced below. It is apparent that, the drawings in the description below represent merely some embodiments of the present application, and other drawings apart from these drawings may also be obtained by a person skilled in the art without involving inventive skills.

DETAILED DESCRIPTION OF THE INVENTION

It is an object of the present application to provide a sitting posture detection apparatus and method, which calculates face angles and bone feature point coordinates of a human frame under detection to generate standard sitting posture data to further determine a sitting posture of a person under detection, thereby achieving accurate sitting posture determination.

Figure 1:
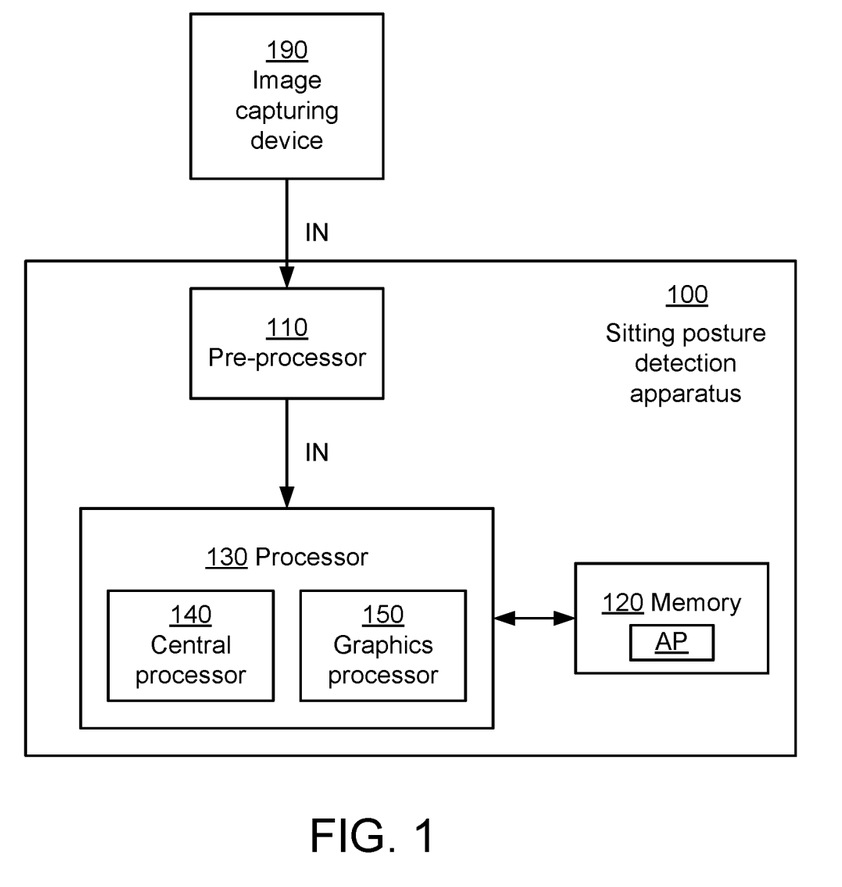
FIG. 1 is a block diagram of a sitting posture detection apparatus according to an embodiment of the present application.

Refer to FIG. 1. FIG. 1 shows a block diagram of a sitting posture detection apparatus 100 according to an embodiment of the present application.

The sitting posture detection apparatus 100 is configured to receive an input image IN from an image capturing device 190 so as to detect a sitting posture of a person under detection in the input image IN. In one embodiment, the image capturing device 190 may be a camera having one single lens, and is configured to sense ambient light and capture the input image IN. The input image IN may include a plurality of image frames sequentially in time.

The sitting posture detection apparatus 100 includes a pre-processor 110, a memory 120 and a processor 130.

The pre-processor 110 is configured to perform scaling, color-domain conversion or a combination thereof on the input image IN, and then feed a processed input image to the processor 130.

The memory 120 is configured to store an application AP. The memory 120 may be selectively one single memory or a set of different types of memories so as to store different types of data. In one embodiment, the memory 120 is, for example, a dynamic random access memory (DRAM). In one embodiment, the memory 120 is not in the sitting posture detection apparatus 100, and the sitting posture detection apparatus 100 is connected to the memory 120 by means of an external connection.

The processor 130 is configured to capture and execute the application AP from the memory 120, so as to identify and calculate the input image IN. In one embodiment, the processor 130 may include a central processor 140 and a graphics processor 150. The central processor 130 performs calculation and determination on data of the input image IN, and the graphics processor 150 operates, for example but not limited to, a neural network, to identify the input image IN. In one embodiment, the function of the graphics processor 150 may also be implemented by, for example but not limited to, a neural network processor.

Figure 2:
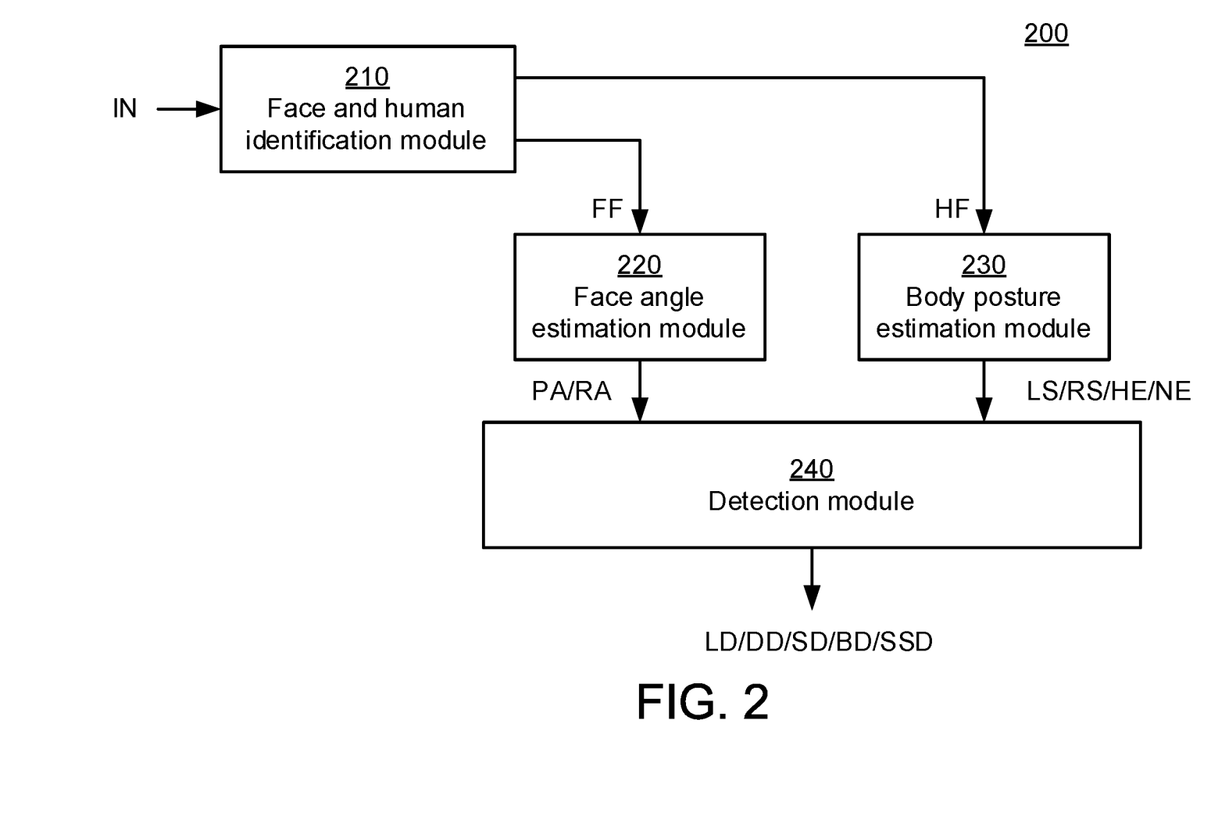
FIG. 2 is a block diagram of a sitting posture detection system according to an embodiment of the present application.

Refer to FIG. 2. FIG. 2 shows a block diagram of a sitting posture detection system 200 according to an embodiment of the present application. The sitting posture detection system 200 is implemented by software (for example, the application AP), and is operated by the processor 130 executing the application AP. The sitting posture detection system 200 includes a face and figure identification module 210, a face angle estimation module 220, a body posture estimation module 230 and a detection module 240.

The face and human identification module 210 is configured to identify the input image IN to generate a face frame under detection FF and a human frame under detection HF of a person under detection.

In one embodiment, the face and human identification module 210 is implemented by a face identification neural network model, and is, for example but not limited to, operated after being captured from the memory 150 by the graphics processor 150 in FIG. 1. The face and human identification module 210 is configured to identify a plurality of face frames and a plurality of human frames from the input image IN, and select a largest human frame from the human frames as the human frame under detection HF.

The face and human identification module 210 further calculates an intersection over union (IOU) of each of the face frames and the largest human frame. More specifically, the face and human identification module 210 divides an intersection area between each of the face frames and the largest human frame by a union area to obtain the IOU, further selecting from the face frames a largest intersecting face frame having the largest IOU with the largest human frame, as the face frame under detection FF.

The face angle estimation module 220 is configured to calculate a plurality of face angles of the face frame under detection FF. The face angles may include, for example but not limited to, a pitch angle PA and a roll angle RA in Euler angles.

Figure 3:
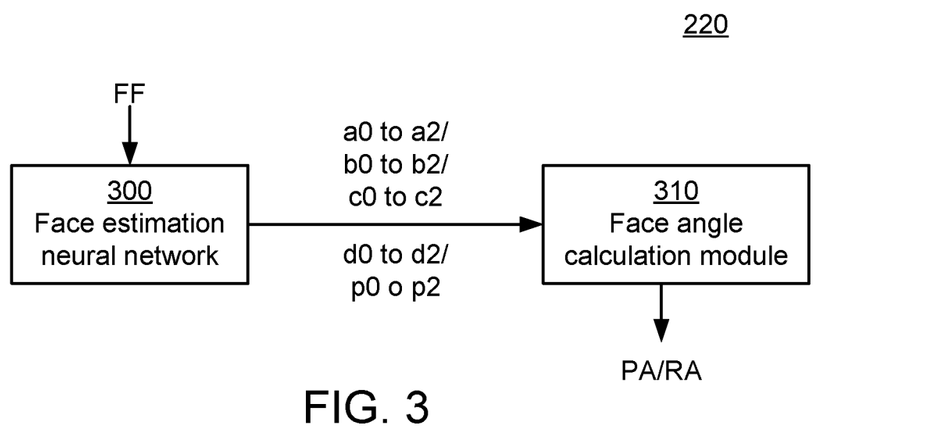
FIG. 3 is a detailed block diagram of a face angle estimation module according to an embodiment of the present application.

Refer to FIG. 3. FIG. 3 shows a more detailed block diagram of the face angle estimation module 220 according to an embodiment of the present application. In one embodiment, the face angle estimation module 220 includes a face estimation neural network 330 and a face angle calculation module 310.

In one embodiment, the face estimation neural network 330 is, for example but not limited to, operated after being captured from the memory 120 by the graphics processor 150 in FIG. 1.

The face estimation neural network 300 is configured to set a plurality of angle intervals corresponding to an angle under calculation of the face angles on average and a plurality of sub-angle intervals included in each angle interval, so as to identify the face frame under detection FF to generate a scale parameter corresponding to each sub-angle interval, an offset parameter corresponding to each angle interval and a probability corresponding to each angle interval.

Taking the pitch angle PA for example, the face estimation neural network 300 uses the pitch angle PA as the angle under calculation, and sets three angle intervals including 0 to 30 degrees, 30 to 60 degrees and 60 to 90 degrees. The angle interval of 0 to 30 degrees includes three incremental sub-angle intervals of 0 to 10 degrees, 10 to 20 degrees and 20 to 30 degrees; the angle interval of 30 to 60 degrees includes three sub-angle intervals of 30 to 40 degrees, 40 to 50 degrees and 50 to 60 degrees; the angle interval of 60 to 90 degrees includes three sub-angle intervals of 60 to 70 degrees, 70 to 80 degrees and 80 to 90 degrees. Thus, the three angle intervals includes a total of nine incremental sub-angle intervals.

Once been trained, the face estimation neural network 300 can identify the face frame under detection FF, and generate scale parameters a0, a1, a2, b0, b1, b2, c0, c1 and c2 corresponding to the nine sub-angle intervals, offset parameters d0, d1 and d2, and probabilities p0, p1 and p2 corresponding to the three angle intervals.

In the parameters above, the scale parameters a0, a1 and a2 respectively correspond to the sub-angle intervals 0 to 10 degrees, 10 to 20 degrees and 20 to 30 degrees, the scale parameters b0, b1 and b2 respectively correspond to the sub-angle intervals 30 to 40 degrees, 40 to 50 degrees and 50 to 60 degrees, and the scale parameters c0, c1 and c2 respectively correspond to the sub-angle intervals 60 to 70 degrees, 70 to 80 degrees and 80 to 90 degrees, so as to respectively represent the scales of objects in the face frame under detection FF in these sub-angle intervals.

The offset parameters d0, d1 and d2 respectively correspond to the angle intervals of 0 to 30 degrees, 30 to 60 degrees and 60 to 90 degrees, so as to respectively represent the offset values of the objects in the face frame under detection FF in these angle intervals. The probabilities p0, p1 and p2 respectively correspond to the angle intervals of 0 to 30 degrees, 30 to 60 degrees and 60 to 90 degrees, so as to respectively represent the probabilities of the objects in the face frame under detection FF in these angle intervals.

In one embodiment, the face angle calculation module 310 is, for example but not limited to, operated after being captured from the memory 120 by the central processor 140 in FIG. 1.

The face angle calculation module 310 is configured to perform calculation on the parameters above according to a predetermined calculation process. First of all, the face angle calculation module 310 calculates products S1, S2 and S3 of all the scale parameters and offset parameters for the angle intervals. In one embodiment, the calculation equations for the products S1, S2 and S3 are as follows:

$$S0 = \sum_{i=0}^{2}(i-1+d0) \times ai \quad \text{(equation 1)}$$

$$S1 = \sum_{i=0}^{2}(i-1+d1) \times bi \quad \text{(equation 2)}$$

$$S2 = \sum_{i=0}^{2}(i-1+d2) \times ci \quad \text{(equation 3)}$$

The face angle calculation module 310 calculates, sequentially in an incremental order, ratios T0, T1 and T2 of the respective products of the angle intervals to the corresponding probability cumulative values, wherein the probability cumulative value is a product total of the probability of a corresponding angle interval of the angle intervals and all the probabilities corresponding to angle intervals smaller than the corresponding angle interval. In one embodiment, the calculation equations for the ratios T0, T1 and T2 are as follows:

$$T0=S0/(3\times(1+p0))  \quad \text{(equation 4)}$$

$$T1=S1/(3\times(1+p1)\times3\times(1+p2))  \quad \text{(equation 5)}$$

$$T2=S2/(3\times(1+p1)\times3\times(1+p2)\times3\times(1+p3))  \quad \text{(equation 6)}$$

The face angle calculation module 310 further sums up all the ratios of the all the angle intervals to obtain the angle under calculation. Taking the pitch angle PA for example, the calculation equation thereof is as follows:

$$PA=(T0+T1+T2)\times NF  \quad \text{(equation 7)}$$

In (equation 7), NF is a normalization parameter, and the value thereof can be set according to requirements so as to converge a network. In an actual numerical example, NF is 99. However, the present application is not limited to the example above.

In one embodiment, the roll angle RA may also be obtained according to the method above, and associated details are omitted herein.

It should be noted that, the details for dividing, setting numerical values and accordingly calculating the angle intervals above and settings of some parameters in the equations are merely examples. In other embodiments, the angle intervals may also be set using other methods or numerical values, or the face angles may be obtained by using other calculation methods or parameter settings for calculation. It should be noted that the present application is not limited to the examples above.

The body posture estimation module 230 is configured to calculate a plurality of bone feature point coordinates of the human frame under detection HF. The bone feature point coordinates may include, for example but not limited to, left should coordinates LS, right shoulder coordinates RS, head vertex coordinates HE and neck coordinates NE.

Figure 4:
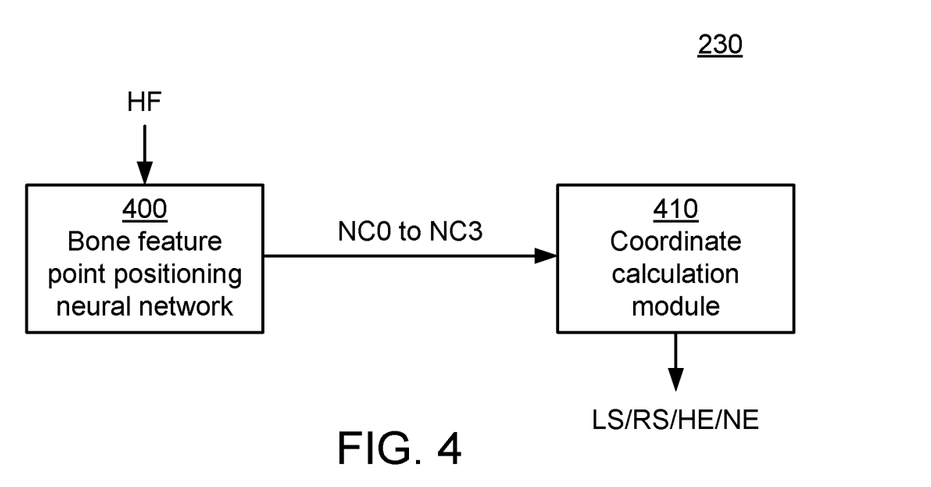
FIG. 4 is a detailed block diagram of a body posture estimation module according to an embodiment of the present application.

Refer to FIG. 4. FIG. 4 shows a more detailed block diagram of the body posture estimation module 230 according to an embodiment of the present application. In one embodiment, the body posture estimation module 230 includes a bone feature point positioning neural network 400 and a coordinate calculation module 410.

In one embodiment, the bone feature point positioning neural network 400 is, for example but not limited to, operated after being captured from the memory 120 by the graphics processor 150 in FIG. 1.

The bone feature point positioning neural network 400 is configured to identify a plurality of normalized feature values NC0 to NC3 corresponding to a plurality of bone feature points from the frame under detection HF.

Once been trained, the bone feature point positioning neural network 400 can identify the human frame under detection HF to capture as many as, for example but not limited to, 4 normalized feature values NC0 to NC3 corresponding to bone feature points corresponding to a human body. However, in this embodiment, the body posture estimation module 230 can need use only the normalized feature values NC0 to NC3 corresponding to the bone feature points of the left shoulder, the right shoulder, the head and the neck.

In one embodiment, the coordinate calculation module 410 is, for example but not limited to, operated after being captured from the memory 120 by the central processor 140 in FIG. 1.

The coordinate calculation module 410 is configured to multiply the normalized feature values NC0 to NC3 by the width and the height of the input image IN, so as to obtain bone feature point coordinates including the left shoulder coordinates LS, the right shoulder coordinates RS, the head vertex coordinates HE and the neck coordinates NE. In one embodiment, the left shoulder coordinates LS, the right shoulder coordinates RS, the head vertex coordinates HE and the neck coordinates NE include horizontal coordinates along the X-axis direction and vertical coordinates along the Y-axis direction.

The detection module 240 is configured to determine according to the face angles whether the person under detection has a head deviation, and determine according to the bone feature point coordinates whether the person under detection has a posture deviation. When the person under detection does not have the head deviation or the posture deviation, the detection module 240 generates standard sitting posture data corresponding to the person under detection.

In one embodiment, the detection module 240 sets an angle deviation condition, so as to determine that the person under detection has the head deviation when the face angles meet the angle deviation condition. The detection module 240 can also set a posture deviation condition, so as to determine that the person under detection has the posture deviation when the bone feature point coordinates meet the posture deviation condition. When the face angles do not meet the angle deviation condition and the bone feature point coordinates do not meet the posture deviation condition, the detection module 240 generates the standard sitting posture data corresponding to the face angles and the bone feature point coordinates at this point.

Figure 5:
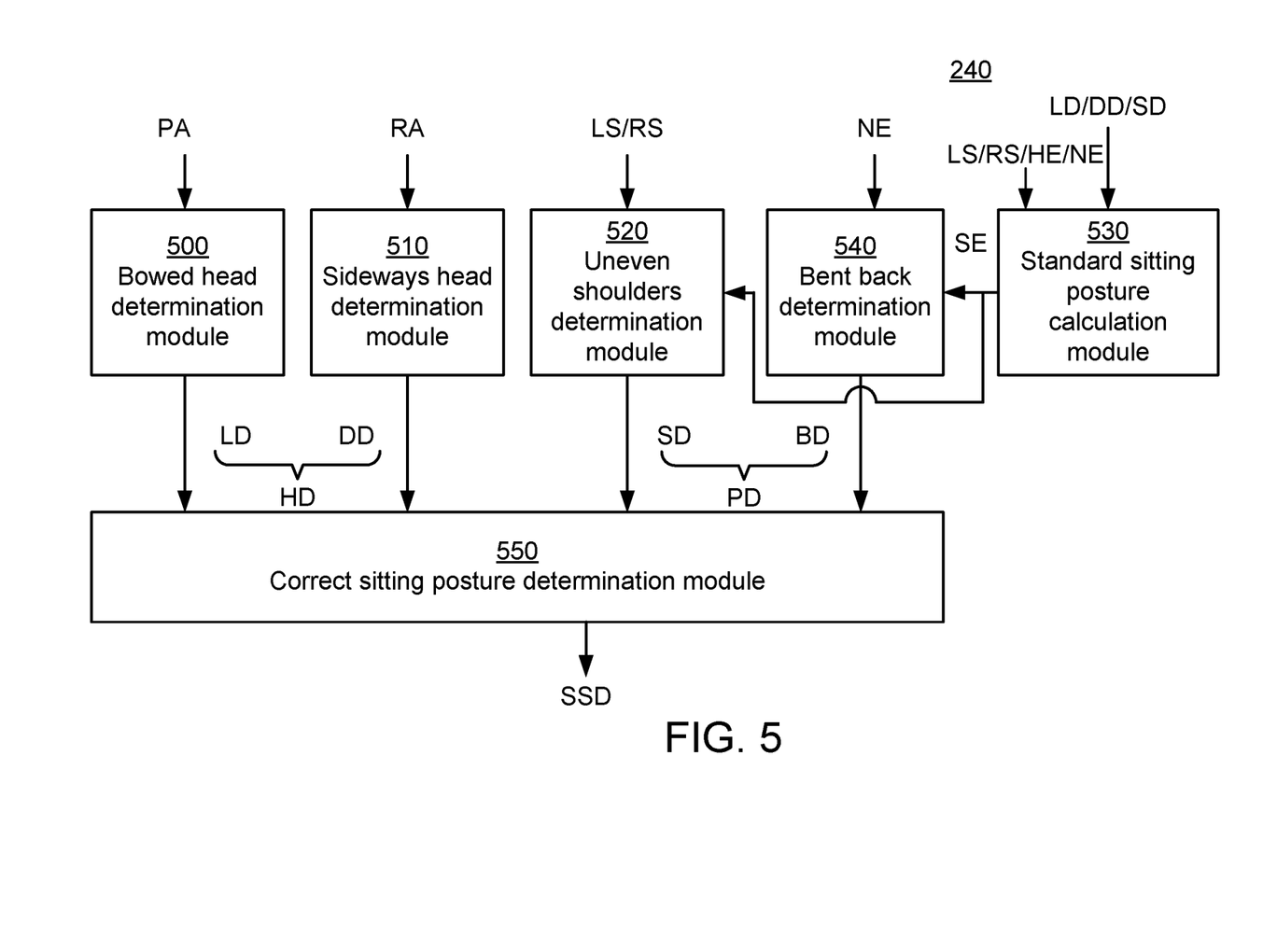
FIG. 5 is a detailed block diagram of a detection module according to an embodiment of the present application.

Refer to FIG. 5. FIG. 5 shows a more detailed block diagram of the detection module 240 according to an embodiment of the present application. In one embodiment, the detection module 240 includes a bowed head determination module 500, a sideways head determination module 510, an uneven shoulder determination module 520, a standard sitting posture calculation module 530, a bent back determination module 540 and a correct sitting posture determination module 550.

The bowed head determination module 500 is configured to generate a bowed head determination result LD so as to further determine that the face angles meet the angle deviation condition when the pitch angle PA is greater than a predetermined pitch angle, such that the bowed head determination result LD shows the occurrence of a bowed head included in the head deviation of the person under detection.

The sideways head determination module 510 is configured to generate a sideways head determination result DD so as to further determine that the face angles meet the angle deviation condition when the roll angle RA is greater than a predetermined roll angle, such that the sideways head determination result DD shows the occurrence of a sideways head included in the head deviation of the person under detection.

The uneven shoulder determination module 520 is configured to generate an uneven shoulder determination result SD so as to further determine that the bone feature point coordinates meet the posture deviation condition when an absolute difference between the vertical coordinates of the left shoulder coordinates LS and the right shoulder coordinates RS is greater than a shoulder threshold, such that the uneven shoulder determination result SD shows the occurrence of uneven shoulders included in the posture deviation of the person under detection.

The standard sitting posture calculation module 530 is configured to receive the bowed head determination result LD, the sideways head determination result DD and the uneven shoulder determination result SD, so as to generate standard sitting posture data SE when the person under detection does not have the head deviation or the posture deviation.

In one embodiment, the standard sitting posture calculation module 530 is configured to, when neither of the head deviation and the posture deviation takes place in a predetermined number of a plurality of consecutive image frames of the input image IN, for example but not limited to, 15 image frames, calculate an average of the bone feature point coordinates corresponding to these image frames and record the average as standard bone feature point coordinates in the standard sitting posture data SE. According to actual requirements, the standard sitting posture calculation module 530 can generate the standard sitting posture data SE according to different numbers of bone feature point coordinates. For example, the standard sitting posture calculation module 530 can store at least five sets of bone feature point coordinates as the standard sitting posture data SE. When a higher precision is needed, the standard sitting posture calculation module 530 can also store all the captured bone feature point coordinates as the standard sitting posture data SE.

For different persons under detection having different heights and body built types, the standard sitting posture calculation module 530 generates the standard sitting posture data SE individually corresponding to the different persons under detection. The standard sitting posture calculation module 530 does not again generate the standard sitting posture data SE once the standard sitting posture data SE have been generated.

However, in the event that the person under detection is detected to have significant changes, for example but not limited to, when the current person under detection leaves a range of the input image IN and returns or is replaced by another person under detection, the posture sitting detection system 200 again performs the above process of generating the standard sitting posture data SE so as to generate new standard sitting posture data SE.

Once the standard sitting posture data SE has been generated, the uneven shoulder determination module 520 and the bent back determination module 540 determine a sitting posture of the person under detection according to the standard sitting posture data SE.

The uneven shoulder determination module 520 is configured to continuously compare the bone feature point coordinates with the standard bone feature point coordinates stored in the standard sitting posture data SE so as to further generate the uneven shoulder determination result SD. In one embodiment, the uneven shoulder determination module 520 may determine a level of deviation between the detected bone feature point coordinates and the standard bone feature point coordinates of the standard sitting posture data SE, so as to further determine that the bone feature point coordinates meet the posture deviation condition when the level of deviation is greater than a predetermined value, such that the uneven shoulder determination result SD shows the occurrence of uneven shoulders included in the posture deviation of the person under detection.

The bent back determination module 540 is configured to compare the neck coordinates NE with standard neck coordinates stored in the standard sitting posture data SE so as to further generate a bent back determination result BD. In one embodiment, the bent back determination module 540 determines that the bone feature point coordinates meet the posture deviation condition when an absolute difference between the neck coordinates is greater than a neck threshold, such that the bent back determination result BD shows the occurrence of a bent back included in the posture deviation of the person under detection.

The correct sitting posture determination module 550 is configured to receive a head deviation determination result HD corresponding to the head deviation, so as to determine whether the head deviation takes place. More specifically, the head deviation determination result HD includes the bowed head determination result LD and the sideways head determination result DD. The correct sitting posture determination module 550 can determine, according to the bowed head determination result LD and the sideways head determination result DD, that the head deviation takes place when either of the bowed head and the sideways head is present.

The correct sitting posture determination module 550 is configured to receive a posture deviation determination result PD corresponding to the posture deviation, so as to determine whether the posture deviation takes place. More specifically, the posture deviation determination result PD includes the uneven shoulder determination result SD and the bent back determination result BD. The correct sitting posture determination module 550 can determine, according to the uneven shoulder determination result SD and the bent back determination result BD, that the head deviation takes place when either of the uneven shoulders and the bent back is present.

The correct sitting posture determination module 550 is configured to generate a standard sitting posture determination result SSD according to the head deviation determination result HD and the posture deviation determination result PD, such that the standard sitting posture determination result SSD shows that the person under detection is in a correct sitting posture when neither of the head deviation and the posture deviation takes place.

In one embodiment, the processor 130 in FIG. 1 can control a communication interface including a screen and/or a loudspeaker. The sitting posture detection system 200, when initially operated, provides an image and sound to prompt a user to sit down, and while the detection is ongoing or once the detection is completed, prompts, according to the bowed head determination result LD, the sideways head determination result DD, the uneven shoulder determination result SD, the bent back determination result BD and the standard sitting posture determination result SSD, whether the user has a bowed head, a sideways head, uneven shoulders and a bent back and whether the user is in a correct sitting posture. It should be noted that the present application is not limited to the examples above.

Figure 6:
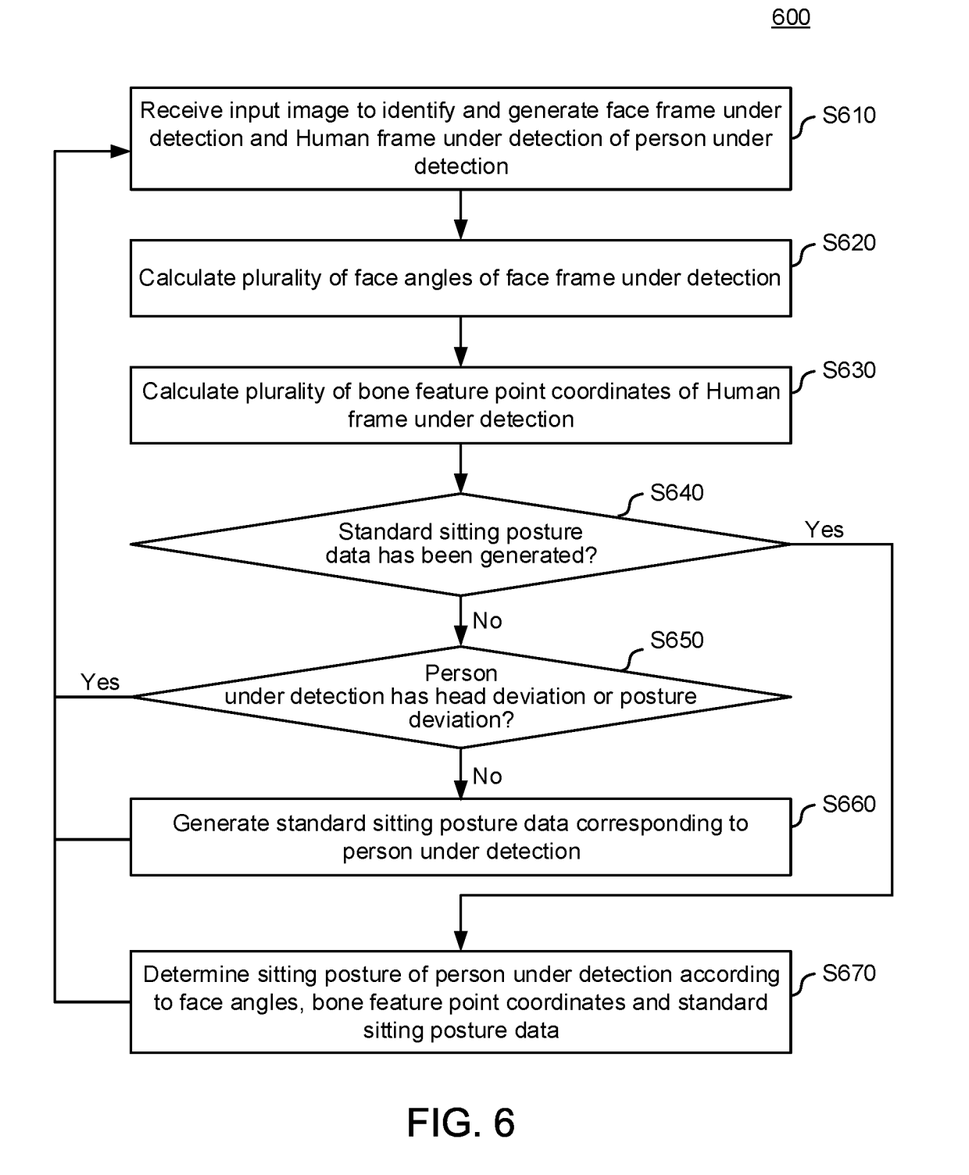
FIG. 6 is a flowchart of a sitting posture detection method according to an embodiment of the present application.

Refer to FIG. 6. FIG. 6 shows a flowchart of a sitting posture detection method 600 according to an embodiment of the present application. In addition to the above apparatus, the present application further provides a sitting posture detection method 600 applied to, for example but not limited to, the sitting posture detection apparatus 100 in FIG. 1. According to an embodiment, the sitting posture detection method 600 includes the steps as shown in FIG. 6.

In step S610, the face and human identification module 210 receives the input image IN so as to identify the input image IN and generate the face frame under detection FF and the human frame under detection HF of the person under detection.

In step S620, the face angle estimation module 220 calculates the plurality of face angles of the face frame under detection FF.

In step S630, the body posture estimation module 230 calculates the plurality of bone feature point coordinates of the human frame under detection H F.

In step S640, the detection module 240 determines whether the standard sitting posture data have been generated.

In step S650, when the standard sitting posture data have not yet been generated, the detection module 240 determines whether the person under detection has the head deviation or the posture deviation.

When it is detected that the person under detection has the head deviation or the posture deviation, the process returns to step S610 to again perform the detection of the steps above.

In step S660, when it is detected that the person under detection does not have the head deviation or the posture deviation, the detection module 240 generates the standard sitting posture data corresponding to the person under detection.

In step S670, when the standard sitting posture data have been generated, the detection module 240 determines a sitting posture of the person under detection according to the face angles, the bone feature point coordinates and the standard sitting posture data.

Figure 7:
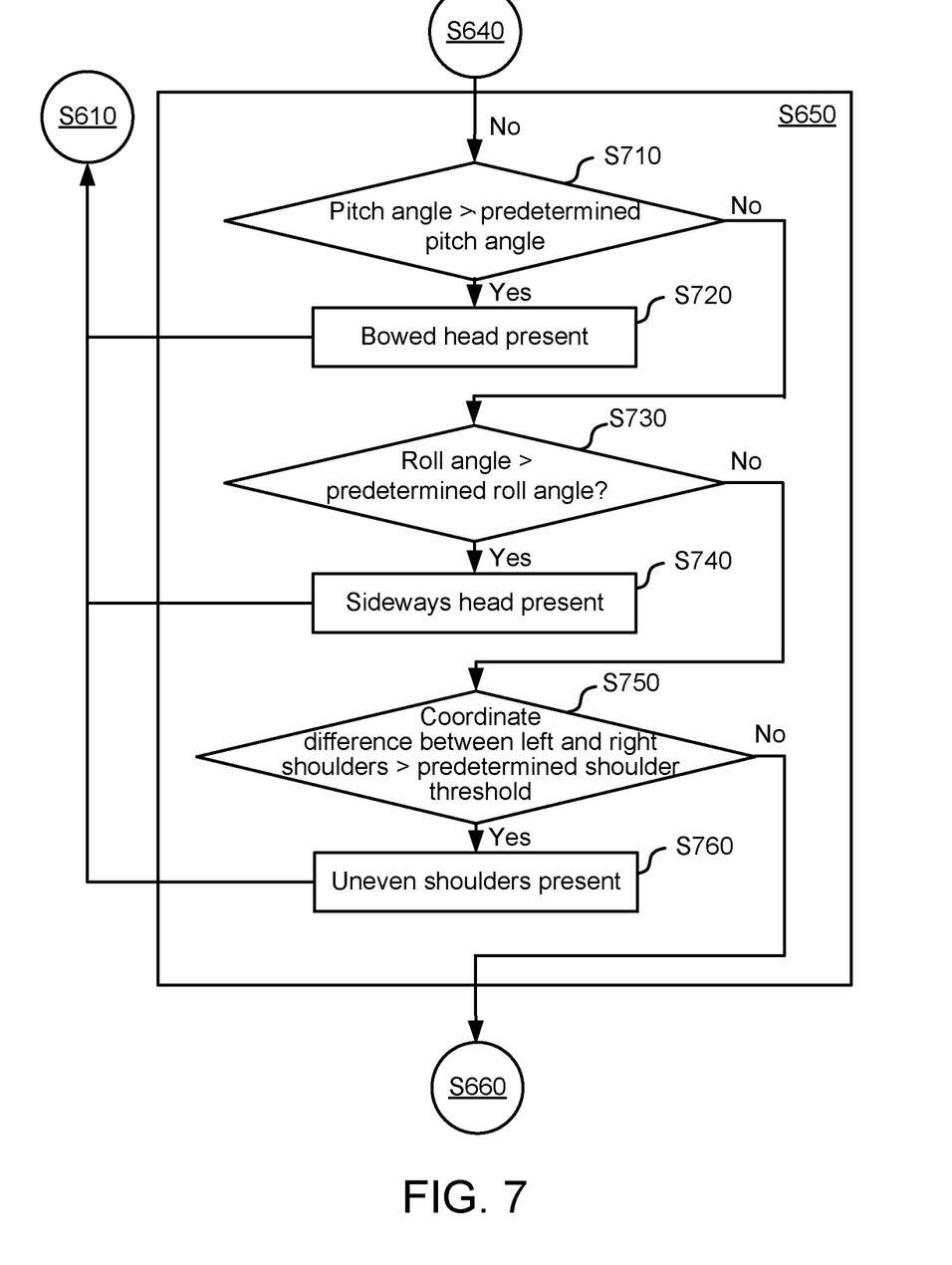
FIG. 7 is a detailed flowchart of step S650 in FIG. 6 according to an embodiment of the present application.

Refer to FIG. 7. FIG. 7 shows a more detailed flowchart of step S650 in FIG. 6 according to an embodiment of the present application.

In step S710, the bowed head determination module 500 determines whether the pitch angle PA is greater than the predetermined pitch angle.

In step S720, when the pitch angle PA is greater than the predetermined pitch angle, the bowed head determination module 500 determines that a bowed head is present. The process returns to step S610 in FIG. 6 to again perform the detection.

In step S730, when the pitch angle PA is not greater than the predetermined pitch angle, the bowed head determination module 500 determines that a bowed head is not present, and the sideways head determination module 510 determines whether an absolute value of the roll angle RA is greater than the predetermined roll angle.

In step S740, when the absolute value of the roll angle RA is greater than the predetermined roll angle, the sideways head determination module 510 determines that a sideways head is present. The process returns to step S610 in FIG. 6 to again perform the detection.

In step S750, when the roll angle RA is not greater than the predetermined roll angle, the sideways head determination module 510 determines that a sideways head is not present, and the uneven shoulder determination module 520 determines whether an absolute difference between the vertical coordinates of the left shoulder coordinates LS and the right shoulder coordinates RS is greater than the shoulder threshold.

In step S760, when the absolute difference between the vertical coordinates is greater than the shoulder threshold, the uneven shoulder determination module 520 determines that uneven shoulders are present. The process returns to step S610 in FIG. 6 to again perform the detection.

When the absolute difference between the vertical coordinates is not greater than the shoulder threshold, the uneven shoulder determination module 520 determines that uneven shoulders are not present. The process returns to step S660 in FIG. 6, so as to generate the standard sitting posture data corresponding to the person under detection according to the bone feature point coordinates at this point.

Figure 8:
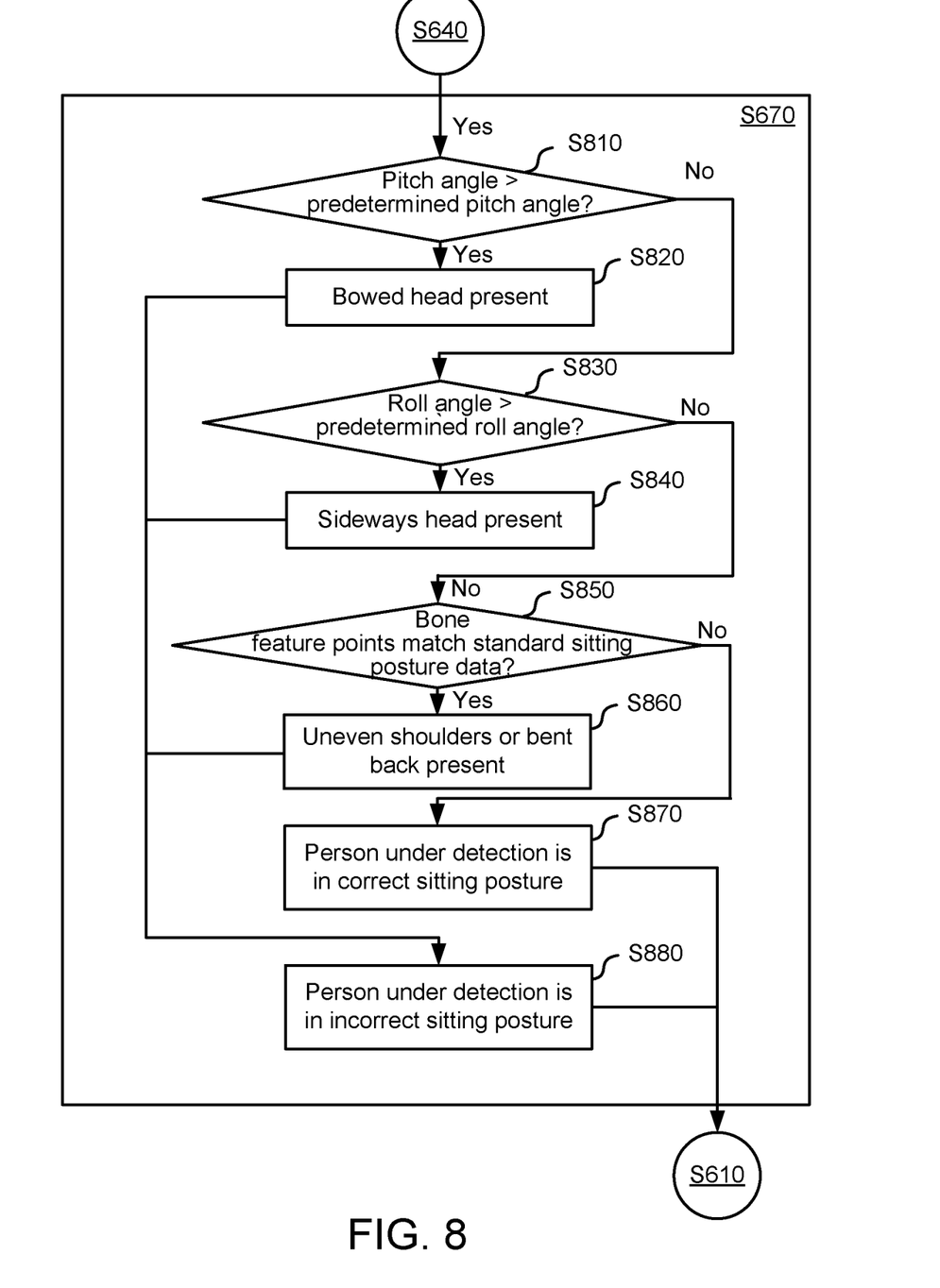
FIG. 8 is a detailed flowchart of step S670 in FIG. 6 according to an embodiment of the present application.

Refer to FIG. 8. FIG. 8 shows a more detailed flowchart of step S670 in FIG. 6 according to an embodiment of the present application.

In step S810, the bowed head determination module 500 determines whether the pitch angle PA is greater than the predetermined pitch angle.

In step S820, when the pitch angle PA is greater than the predetermined pitch angle, the bowed head determination module 500 determines that a bowed head is present. The process proceeds to step S880 so as to determine whether that the person under detection is in an incorrect sitting posture.

In step S830, when the pitch angle PA is not greater than the predetermined pitch angle, the bowed head determination module 500 determines that a bowed head is not present, and the sideways head determination module 510 determines whether an absolute value of the roll angle RA is greater than the predetermined roll angle.

In step S840, when the absolute value of the roll angle RA is greater than the predetermined roll angle, the sideways head determination module 510 determines that a sideways head is present. The process proceeds to step S880 so as to determine whether that the person under detection is in an incorrect sitting posture.

In step S850, when the absolute value of the roller angle RA is not greater than the predetermined roll angle, the sideways head determination module 510 determines that a sideways head is not present, and the uneven shoulder determination module 520 and the bent back determination module 540 determine whether the bone feature point coordinates match the standard sitting posture data.

In step S860, when the bone feature point coordinates do not match the standard sitting posture data, the uneven shoulder determination module 520 and the bent back determination module 540 determine that uneven shoulders and a bent back are present. The process proceeds to step S880 so as to determine whether that the person under detection is in an incorrect sitting posture.

In step S870, when the bone feature point coordinates match the standard sitting posture data, the uneven shoulder determination module 520 and the bent back determination module 540 determine that uneven shoulders or a bent back is not present, further determining that the person under detection is in a correct sitting posture.

It should be noted that the embodiments above serve as merely examples. In other embodiments, modifications may be made by a person skilled in the art without departing from the spirit of the disclosure. It should be understood that the steps described in the embodiments above, unless the orders are otherwise specified, may have orders adjusted according to actual requirements, or the steps may all or partially be performed simultaneously.

The sitting posture detection apparatus and method of the present application are capable of determining, by means of calculating face angles of a face frame under detection, whether a person under detection has a head deviation, and by means of calculating bone feature point coordinates of a human frame, whether the person under detection has a posture deviation, hence achieving accurate sitting posture determination. The sitting posture detection apparatus and method of the present application do not require multiple images obtained by multiple lenses for determination, and are capable of separately determining deviations of the head and the posture, hence providing features of diversified determination mechanisms at low costs.

While the present application has been described by way of example and in terms of the preferred embodiments, it is to be understood that the present application is not limited thereto. On the contrary, it is intended to cover various modifications and similar arrangements and procedures, and the scope of the appended claims therefore should be accorded with the broadest interpretation so as to encompass all such modifications and similar arrangements and procedures.

What is claimed is:

1. A sitting posture detection apparatus, comprising:
a processor, configured to execute a program code of a sitting posture detection system, the sitting posture detection system comprising:
a face and human identification module, configured to identify an input image and generate a face frame under detection and a human frame under detection of a person under detection;
a face angle estimation module, configured to calculate a plurality of face angles of the face frame under detection;
a body posture estimation module, configured to calculate a plurality of bone feature point coordinates of the human frame under detection; and
a detection module, configured to generate standard sitting posture data according to the face angles and the bone feature point coordinates, and determine a sitting posture of the person under detection according to the face angles, the bone feature point coordinates and the standard sitting posture data;
wherein the face and human identification module is configured to:
identify a plurality of face frames and a plurality of human frames from the input image;
select a largest human frame from the human frames as the human frame under detection; and
select, from the face frames, a largest intersecting face frame having a largest intersection over union (IOU) with the largest human frame, as the face frame under detection, and
wherein the processor controls a communication interface to at least one of prompt the person to sit down to obtain the input image and prompt the person regarding the sitting posture of the person.

2. The sitting posture detection apparatus according to claim 1, wherein the detection module determines, according to the face angles, whether the person under detection has a head deviation and determines, according to the bone feature point coordinates, whether the person under detection has a posture deviation; when the person under detection does not have the head deviation or the posture deviation, the detection module generates the standard sitting posture data corresponding to the person under detection.

3. The sitting posture detection apparatus according to claim 2, wherein the detection module determines, according to the bone feature point coordinates and the standard sitting posture, whether the person under detection has a bent back.

4. The sitting posture detection apparatus according to claim 3, wherein the bone feature point coordinates comprise neck coordinates, and the detection module determines, according to the neck coordinates and standard neck coordinates in the standard sitting posture data, whether the person under detection has the bent back.

5. The sitting posture detection apparatus according to claim 2, wherein when the person under detection does not have the head deviation or the posture deviation in a predetermined number of a plurality of consecutive image frames of the input image, the detection module generates the standard sitting posture data corresponding to the person under detection.

6. The sitting posture detection apparatus according to claim 1, wherein the face and human identification module comprises:
a face estimation neural network, configured to identify the face frame under detection in a plurality of angle intervals by using a corresponding angle under calculation of the face angles to generate at least one scale parameter, at least one offset parameter and at least one probability corresponding to each of the angle intervals; and
a face angle calculation module, configured to perform calculation according to the at least one scale parameter, the at least one offset parameter and the at least one probability to obtain the angle under calculation.

7. A sitting posture detection apparatus, comprising:
a processor, configured to execute a program code of a sitting posture detection system, the sitting posture detection system comprising:
a face and human identification module, configured to identify an input image and generate a face frame under detection and a human frame under detection of a person under detection;
a face angle estimation module, configured to calculate a plurality of face angles of the face frame under detection;
a body posture estimation module, configured to calculate a plurality of bone feature point coordinates of the human frame under detection; and
a detection module, configured to generate standard sitting posture data according to the face angles and the bone feature point coordinates, and determine a sitting posture of the person under detection according to the face angles, the bone feature point coordinates and the standard sitting posture data,
wherein the body posture estimation module comprises:
a bone feature point positioning neural network, configured to identify a plurality of normalized feature values corresponding to the plurality of bone feature points from the human frame; and
a coordinate calculation module, configured to obtain the bone feature point coordinates according to the normalized feature values and a width and a height of the input image, and
wherein the processor controls a communication interface to at least one of prompt the person to sit down to obtain the input image and prompt the person regarding the sitting posture of the person.

8. A sitting posture detection method, comprising:
identifying an input image to generate a face frame under detection and a human frame under detection of a person under detection;
calculating a plurality of face angles of the face frame under detection;
calculating a plurality of bone feature point coordinates of the human frame under detection;
generating standard sitting posture data according to the face angles and the bone feature point coordinates, and
determining a sitting posture of the person under detection according to the face angles, the bone feature point coordinates and the standard sitting posture data;

controlling a communication interface to at least one of prompt the person to sit down to obtain the input image and prompt the person regarding the sitting posture of the person, wherein the calculating of a plurality of face angles of the face frame under detection comprises:

identifying the face frame under detection in a plurality of angle intervals by using a corresponding angle under calculation of the face angles to generate at least one scale parameter, at least one offset parameter and at least one probability corresponding to each of the angle intervals; and performing calculation according to the at least one scale parameter, the at least one offset parameter and the at least probability to obtain the angle under calculation.

9. The sitting posture detection method according to claim 8, wherein the generating of standard sitting posture data according to the face angles and the bone feature point coordinates comprises:

determining, according to the face angles, whether the person under detection has a head deviation;

determining, according to the bone feature point coordinates, whether the person under detection has a posture deviation; and when the person under detection does not have the head deviation or the posture deviation, generating the standard sitting posture data corresponding to the person under detection.

10. The sitting posture detection method according to claim 8, wherein the determining of a sitting posture of the person under detection according to the face angles, the bone feature point coordinates and the standard sitting posture data comprises:

determining, according to the bone feature point coordinates and the standard sitting posture, whether the person under detection has a bent back.

11. The sitting posture detection method according to claim 8, wherein the identifying of an input image to generate a face frame under detection and a human frame under detection of a person under detection comprises:

identifying a plurality of face frames and a plurality of human frames from the input image;

selecting a largest human frame from the human frames as the human frame under detection; and selecting, from the face frames, a largest intersecting face frame having a largest intersection over union (IOU) with the largest human frame, as the face frame under detection.

* * * * *